4 Sheets—Sheet 1.

W. LOTTRIDGE.
GRAIN-BINDERS.

No. 181,954. Patented Sept. 5, 1876.

Witnesses:
J. West Wagner
J. A. Rutherford

Inventor:
W<sup>m</sup> Lottridge
by Johnson & Johnson
Att'ys.

N. PETERS, PHOTO-LITHOGRAPHER, WASHINGTON, D. C.

W. LOTTRIDGE.
GRAIN-BINDERS.
No. 181,954. Patented Sept. 5, 1876.
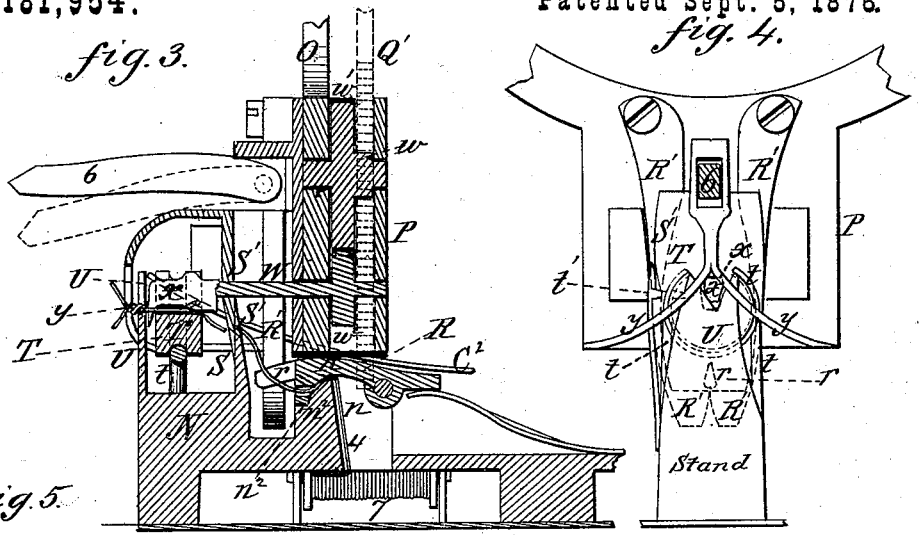
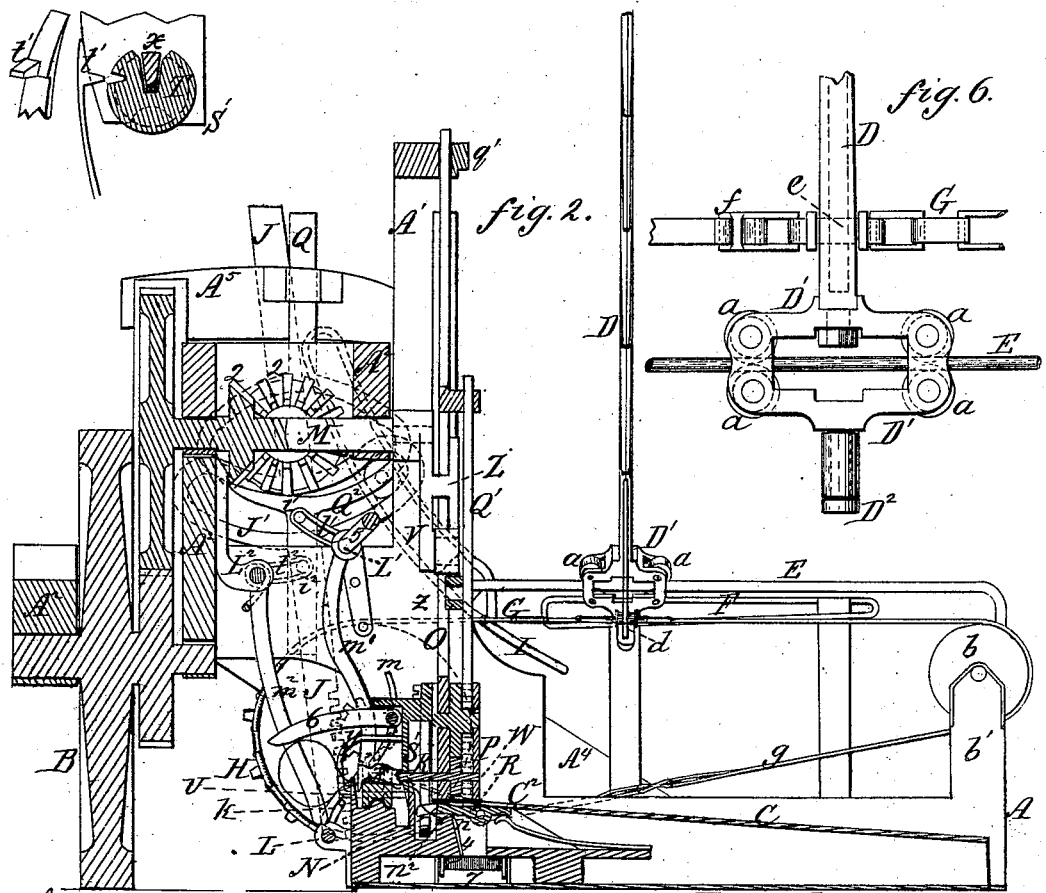
Witnesses:
J. West Wagner
J. A. Rutherford
Inventor:
Wm Lottridge
by Johnson & Johnson
Att'ys.

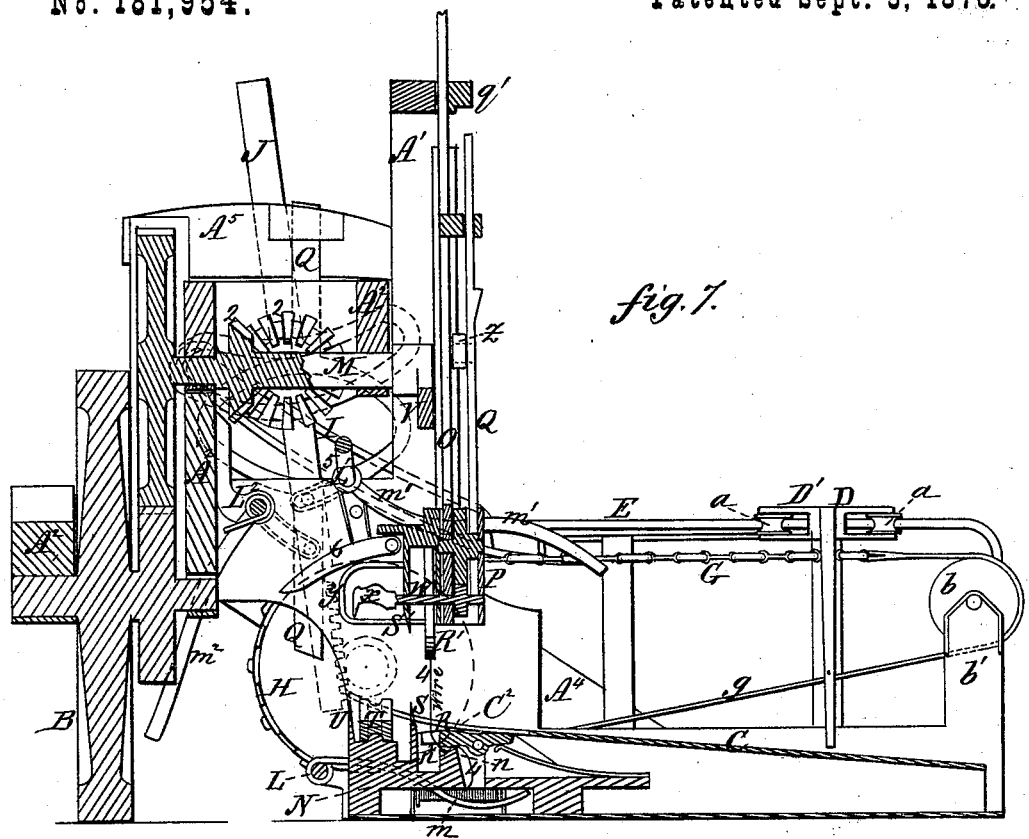
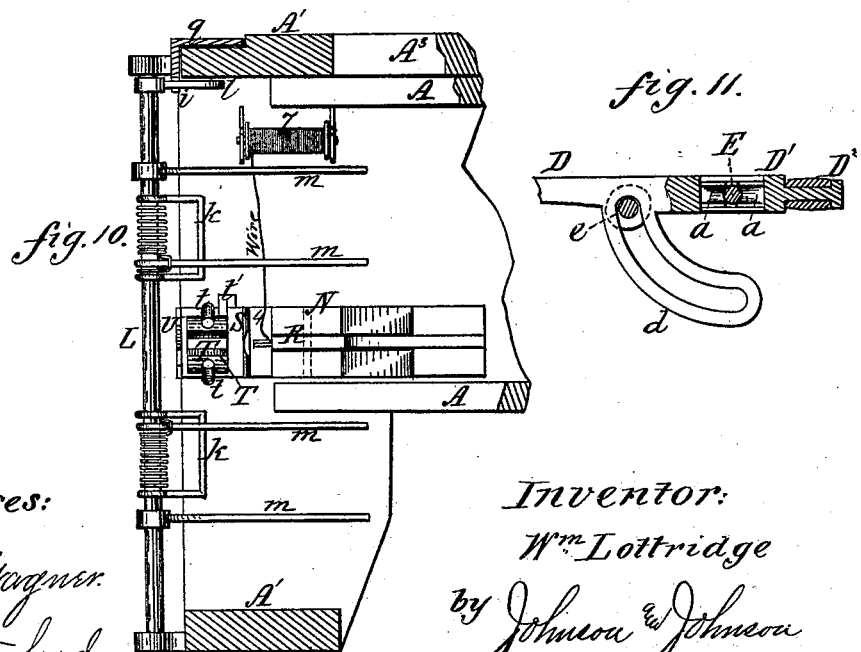

W. LOTTRIDGE.
GRAIN-BINDERS.

No. 181,954. Patented Sept. 5, 1876.

Witnesses:

Inventor:
Wm Lottridge
by Johnson & Johnson
Att'ys

UNITED STATES PATENT OFFICE.

WILLIAM LOTTRIDGE, OF OSAGE, IOWA, ASSIGNOR OF TWO-THIRDS HIS RIGHT TO MARTIN V. NICHOLS, OF SAME PLACE.

IMPROVEMENT IN GRAIN-BINDERS.

Specification forming part of Letters Patent No. 181,954, dated September 5, 1876; application filed May 4, 1876.

*To all whom it may concern:*

Be it known that I, WILLIAM LOTTRIDGE, of Osage, in the county of Mitchell and State of Iowa, have invented certain new and useful Improvements in Grain-Binders for Harvesters, of which the following is a specification:

My improvements relate more particularly to that class of grain-harvesters in which the cut grain, as it falls upon the platform, is conveyed in suitable quantities by an automatic rake to an automatic binding apparatus, compressed into proper form and compass, bound with wire, and dropped upon the ground by and during the forward movement of the machine; and they consist, first, in certain novel and improved means for operating the rake; secondly, in a novel combination of devices for compressing the gavels preparatory to binding, and allowing the sheaves to drop upon the ground; and, thirdly, in a novel automatic mechanism, by which the gavel is bound, the band severed from the main wire, and the cut end of the main wire secured, and the parts restored to their respective positions in readiness for the next gavel, as will be fully understood from the subjoined description, reference being had therein to the accompanying drawings, in which—

Figure 1:
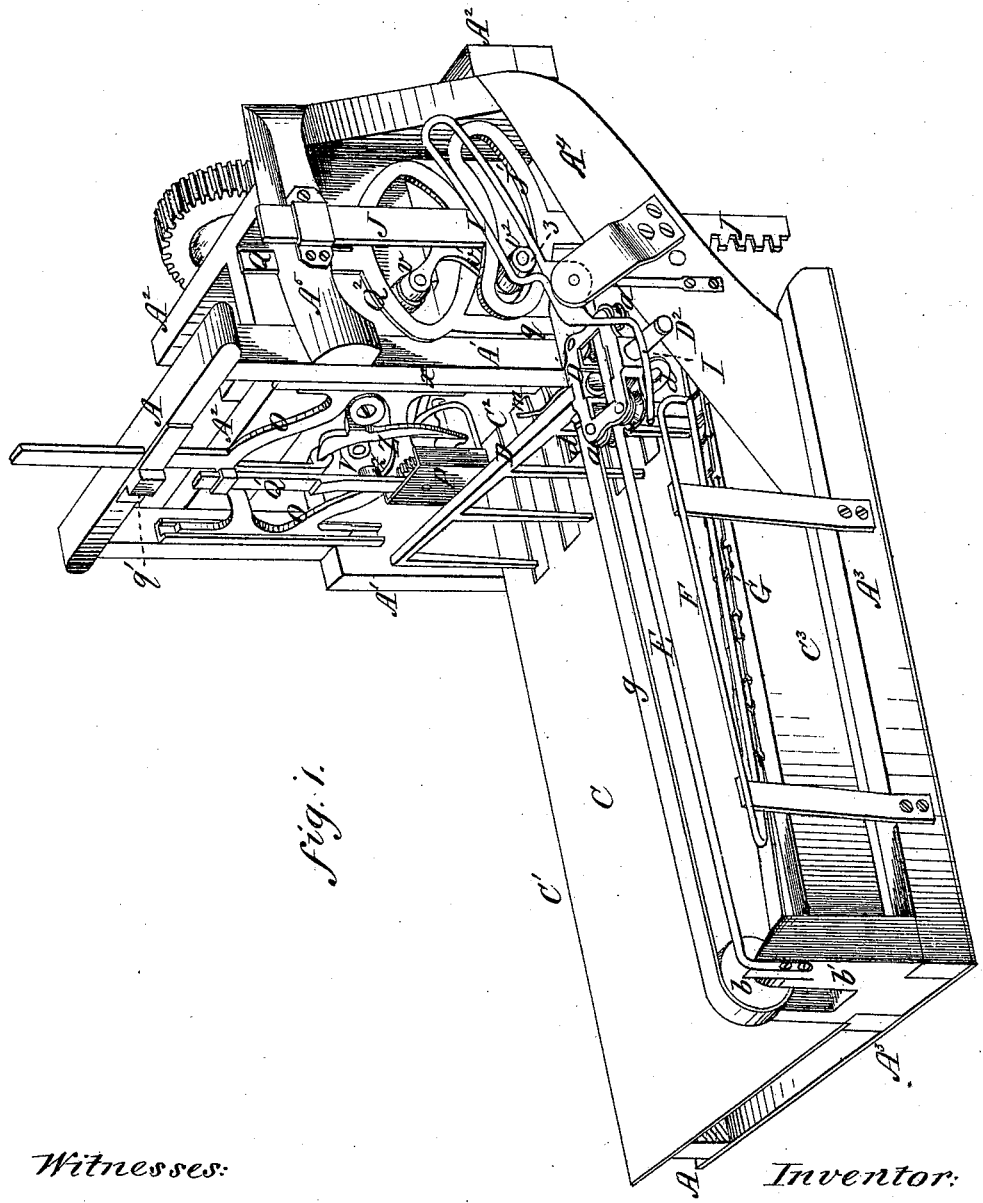
Figure 8:
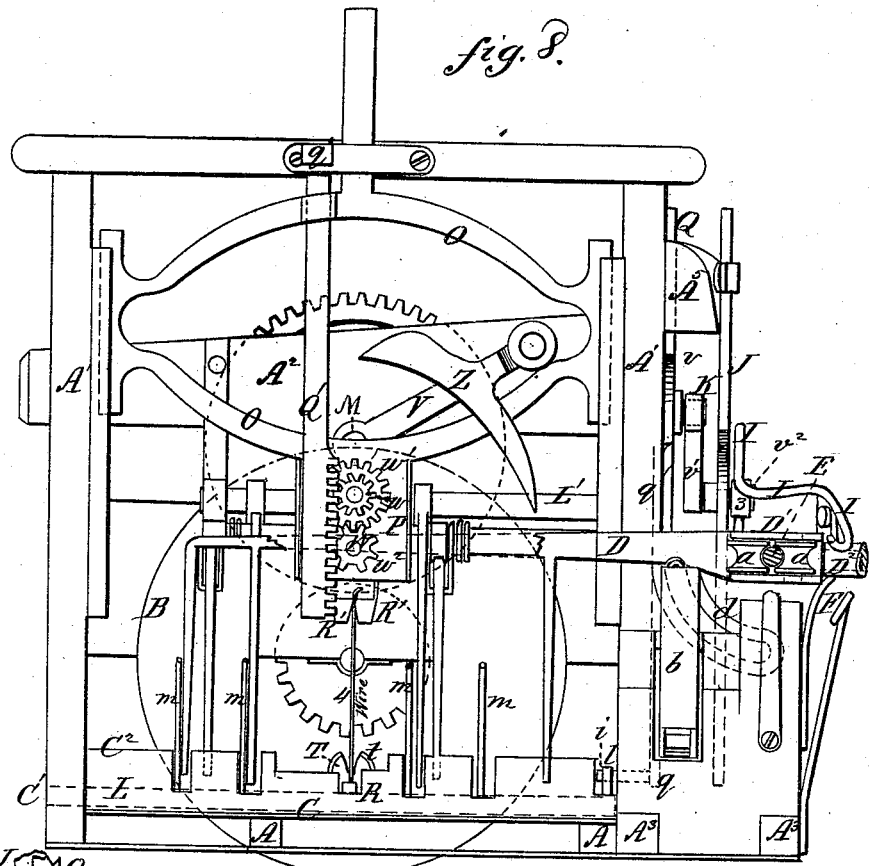
Figure 9:
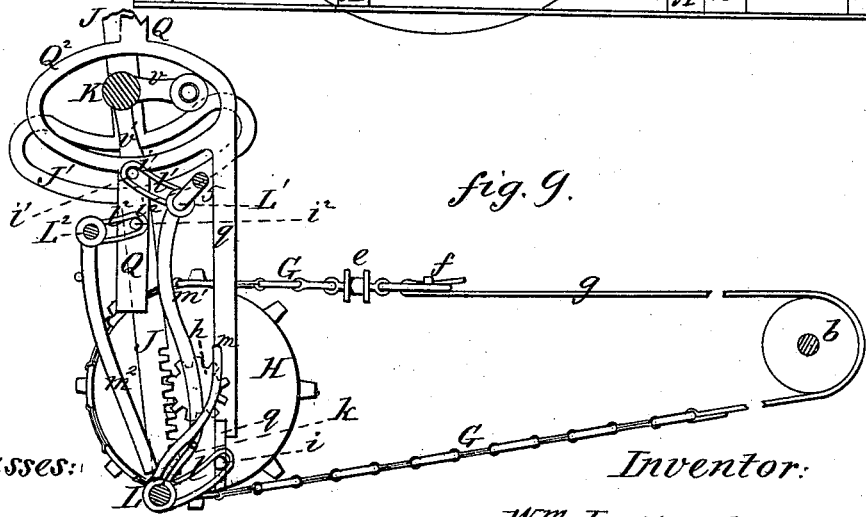

Figure 1, Sheet 1, represents a rear perspective view, showing the relations of the principal parts of the rake and binder, the rake being at the inner end of its sweep, and in the act of being elevated by the switch; Fig. 2, Sheet 2, a transverse section, taken centrally of the binding-carriage and wire-twisting whirl, and showing the parts in the positions which they occupy in binding a compressed gavel and severing the wire; Fig. 3, same sheet, an enlarged view of the same parts in the same positions; Fig. 4, same sheet, a detail view of the whirl support or stand, its forked blade, and the binder-carriage in the positions shown in Fig. 3; Fig. 5, same sheet, a detail view, showing the notched revoluble whirl and the twisting-blade in position therewith, when these two parts co-operate to twist the wire and the spring detent for holding the whirl in position to receive the twisting-blade; Fig. 6, same sheet, a detail plan view of the rake-head and its operating-chain; Fig. 7, Sheet 3, a similar transverse section to Fig. 2, showing the several parts in the positions they severally occupy to receive the gavel from the rake and press it against the binding-wire, which is held by the griping-jaws in position for that purpose; Fig. 8, Sheet 4, an inner side view of the binding mechanism, looking lengthwise of the platform, showing the several parts in the positions they occupy in Fig. 7, the binder-carriage being broken away to expose the gearing by which the wire-twisting device is operated; Fig. 9, same sheet, a detail view of the devices which operate the compressing-fingers; Fig. 10, Sheet 3, a detail plan, showing the binder-stand and its revoluble whirl, the spool to supply the binding-wire, and the binding-fingers in the positions these parts occupy in Fig. 7; and Fig. 11, Sheet 3, a sectional detail of the rake-head, showing its segmental arm for connecting the rake with the operating-chain.

A is the main frame, to which are rigidly secured the platform C and framing supporting the rake and binding apparatus. $A^1$ is the upright frame supporting the active or moving portions of the binder, and secured at the side of the main frame over the inner end of the platform. $A^2$ is the part of the main frame carrying the gearing. $A^3$ are the sills supporting the rear edge of the platform and the upright bearings $b'$ for the pulley $b$, carrying the outer end of the rake-chain; and $A^4$ is an inclined brace, connecting the sills to the main frame, and serving as a bearing for parts hereinafter described.

The grain is cut at the front edge $C^1$ of the platform C by knives, (not shown.) B is the drive or main carrying wheel, between which and the inner end $C^2$ of the platform sufficient space is left for dropping the sheaves. The rake-arm D is provided at its rear end with a carriage or head, $D^1$, within which are journaled two pairs of friction-rolls, $a\ a$, with concave peripheries, and moving back and forth upon a straight cylindrical guide-rod, E, which they closely hug, and which is secured at a suitable distance above and parallel to the rear of the platform C, the friction-rolls $a\ a$ maintaining the rake-arm D firmly at a right angle to the rod, while permitting its rise and fall and its raking and return movements. Projecting from the rear side of carriage or head $D^1$, and in line with the rake-arm, is a short arm, $D^2$, provided with a broad friction-roll, adapted to move upon the periphery of the endless guide F at a suitable distance in rear of the guide-rod E, which guide F may be either a metallic rod bent to form an endless track of the required form—that is, a parallelogram with rounded ends, or made of wood or sheet metal. It is supported by suitable standards from the rear sill, and is set in a plane inclined backward from the perpendicular, so as to make its upper and lower horizontal portions equidistant from the guide-rod E, to which they are parallel. The broad roll on the arm $D^2$ traverses the upper horizontal track of the guide F in its inward or raking movement. When the rake is thus held down upon the platform, and in the outward or return movement the arm $D^2$ is depressed, by means hereafter described, and passes beneath the under side of the guide F, raising the rake-arm and keeping it up out of the way of the falling grain until it regains the outer end of the platform, and is past the end of the guide F, when it drops into raking position. From the under or toothed side of the rake-arm, between the rake proper and the head or carriage $D^1$, projects a segmental arm, $d$, Fig. 11, having formed in it a segmental slot, the curve of which is that of about one-fourth of a circle, whose center is in the line of the guide-rod E. The segmental arm $d$ plays freely up and down upon a link, $e$, of the endless belt or chain G, from which the rake derives its motion, and which is arranged parallel to and forward of the guide-rod E, between it and the platform or grain-bed C, which may be formed with a depression, $C^3$, to allow the belt free motion. The link $e$, Fig. 9, is shouldered on each side of the segmental arm $d$, so that the chain, when moving in either direction, forces the rake D to move with it, and at the same time permits its rise and fall to and from raking position.

About half the endless belt G is formed of links fitting over the teeth of the large sprocket-wheel H, which is keyed upon a short shaft journaled in the brace $A^4$, at the rear of the main frame, and drives the belt. The other half of the belt is of leather, passing over pulley $b$, at the outer end of the platform, and provided with a buckle, $f$, Figs. 6 and 9, or other suitable tightening device. The sprocket-wheel H is given intermittent backward and forward rotation alternately; and the belt has a travel equal to the sweep necessary for the rake—that is, somewhat less than a semi-revolution, and only so much of it as runs upon the sprocket-wheel need be a chain. The advantages of a chain and of a form of belt conveniently tightened are thus combined.

The sprocket-wheel H derives motion through a small pinion, $h$, keyed upon the same shaft, and meshing with and moved by a reciprocating rack-bar, J, moving almost vertically in guides secured to the supports $A^4 A^5$, at the rear of the main frame. The rack-bar J is driven by a rotating crank-shaft, K, Figs. 8 and 9, journaled to the portion $A^2$ of the main frame, and rotated through equal bevel-gear 2 2, Fig. 2, from the shaft M, journaled across the main frame above the axle, from which it is driven either by cog-gearing, such as shown, proportioned to give the proper speed, or by sprocket-wheels and chain.

The shaft K has two crank-arms, $v v^1$, Figs. 8 and 9, upon its rear end, nearly or quite at a right angle with each other. The crank-arm $v^1$ has an arm, $v^2$, Figs. 7 and 8, projecting rearwardly through an upwardly-curving segmental yoke, J', formed in a widened portion of the rack-bar J, and armed with two friction-rolls, end to end, the inner or forward one playing within the yoke J', and the rear one 3 playing in the curved slotted arm of a peculiarly-bent lever, I, pivoted to move vertically on a suitable support extending from the brace $A^4$ or other preferred part of the frame-work. The other arm of the lever I is bent to project beyond the adjacent end of guide F, forward of its line, and between it and the guide-rod E, so as to pass freely up and down between them.

When the outer roll 3, Figs. 1 and 8, on the crank-arm $v^2$, has reached the middle or lowest part of the yoke J', the rack-bar J is raised to its highest and the rake is at the inner end of its sweep, and its short rear arm $D^2$ has passed the inner end of the guide F. The further progress of the roll 3 raises the end of the lever I, causing the other end to depress the arm $D^2$ below the line of the guide F, thus acting as a switch. The rack-bar J begins to descend, and the rake then returns in an elevated position to the outer end of the platform, where, upon passing the end of the guide, it drops.

It will be observed that as the point at which the rake is connected with the belt or chain G is between carriage or head and the rake proper—that is, between the resistance offered by weight of the rake-arm and of the gavel and that caused by the friction of the carriage upon the guide-rod E—is calculated to give the rake a more regular and easy movement, and relieve the parts of friction and strain, by causing the two forms of resistance to counteract instead of aiding one another.

The inner end $C^2$ of the platform or grain-bed C is bent upward in a slight curve, and is deeply slotted or recessed, as shown, in several places, to permit the location, at the middle point thereof, of the stand or support N, for the fixed or passive portions of the binder, and the vertical play, on either side of the stand, of a number of fingers, $m m$, doubly curved in the "line of beauty," as shown, so as to lift the gavels clear of and beyond the binder-stand N and whirl T, and secured, either rigidly or by means permitting them a limited elastic yield—as coiled springs, for example—to a rock-shaft, L, Figs. 2 and 10, journaled in suitable bearings below the plane of the grain-bed C, and transversely to it. These fingers $m$, when not in the performance of their special functions, rest out of the way below the plane of the grain-bed, as in Fig. 7. The rock-shaft L is provided with rigid loops $k\ k$, Fig. 10, projecting inwardly therefrom close on each side of the binder-stand, which strengthen the fingers nearest the stand for tightly compressing the gavel by limiting the outward yield of the fingers, and also serving to limit the inward movement of the auxiliary fingers $m^1\ m^1$. The rock-shaft L is provided at its rear end with a segmentally-slotted crank-arm, $l$, Figs. 9 and 10, projecting horizontally toward the platform when the fingers $m$ are down, in which plays a stud, $i$, projecting from the lower end of an arm, $q$, sliding up and down in vertical grooves or guides upon the framing $A^1$. This arm $q$ forms part of a bar, $Q^1$, which is reciprocated vertically in guides in the framing by means of the crank-arm $v$, Fig. 1, heretofore mentioned, on the rear end of shaft K. The crank $v$ is armed on its inner or front face with a projection and friction-roll playing in an elliptical yoke, $Q^2$, formed in the widened portion of the bar Q. The rake and the compressing-fingers, being both operated from the same crank-shaft, there is a fixed relation between their movements, the fingers $m$ not rising through the platform until the rake has pushed the gavel fairly within their reach, when, by the ascent of the bar Q, they are caused to rise, and their teeth, striking between those of the rake, take the grain and press it forcibly against the wire 4, Figs. 7 and 8, held perpendicularly to receive it and yield to its advance, as hereinafter more fully explained, continuing to push it inward until it is fairly beyond and out of the way of the binder. The gavel then having been formed and ready to drop, the bar Q descends and acts to throw back the teeth in beneath the grain-bed. The convex lower portions of the fingers $m$, in conjunction with the upward curve of the edge of the platform, besides lifting the gavel clear of the binder, also assists to drop the sheaf—that is, these fingers lift and carry the sheaf back over the stand N and whirl. The compressing-fingers $m$ are assisted in shaping and condensing the gavel by the fingers $m^1$—preferably two in number, one on each side of the binder—and mounted on a rock-shaft, $L^1$, which is formed with a bend or recess, 5, in the middle, opposite the binder, to permit the free passage of the finger 6 on the carriage P, and is journaled in hangers or other suitable bearings at a short distance above the platform, and is rocked back and forth by means of a segmentally-slotted arm, $l^1$, Fig. 9, on its rear end, in which plays a stud, $i^1$, on the center bar Q. These fingers $m^1$, on the approach of the rake, are elevated sufficiently to permit the full advance of the gavel, and the slotted crank-arms $l\ l^1$ are so arranged with respect to bar Q that it causes the fingers $m$ and $m^1$ to approach and compress the gavel simultaneously. A third rock-shaft, $L^2$, journaled in hangers or other suitable bearings on the main frame, and provided with long curved spring-fingers $m^2$, is operated likewise through a slotted crank-arm, $l^2$, from a stud, $i^2$, on the inner face of the bar Q, and so arranged that its fingers clasp the gavel on the side nearest the drive-wheel B, assisting to compress it and stop its advance and relieve the wire. The lower ends of these fingers strike the loops $k\ k$, which stop their advance. The return movement of bar Q restores all the compressing-fingers to their former positions.

The cut grain is received from the rake, and seized and held by the compressors at the inner end of the grain-bed, and in so doing they convey it over the stand N, and beyond the edge of the line of the binder, the wire (held in position as hereinafter explained) yielding to the pressure of the gavel, so that when it is fairly compressed and ceases to move enough wire has been pushed out to form a band, and is ready to be twisted and cut.

The spool 7, Fig. 10, for the wire is beneath the grain-bed, at one side of the stand N, which is firmly secured to the lower floor of the grain-bed at the middle of its inner end, and supports the fixed or passive portions of the binder. The stand N has a clear, open space under its inner end; or is perforated laterally for the admission of the wire from the spool, and a vertical perforation permits its passage up through the stand just in front of a small rod or shoulder, $n$, Figs. 2, 3, and 7, secured or formed on the top of the stand N, transversely thereof. The end of the wire is drawn through an eye, $n^2$, projecting from the under side of a latch or divider, R, pivoted to move vertically, and held down by a spring in the rear. The under side of the divider, behind the eye, is channeled transversely, fitting over shoulder $n$ on the stand. Forward of the eye $n^2$ this divider R is made in the form of a narrow blade, $r$, or wedge, Fig. 3, rounded beneath at the forward end, and edged or convex on its upper side, for a purpose hereinafter explained. On the stand forward of the divider, and clear of it, is fixed an upright transverse cutting-blade, S, having a deeply-concave upper edge, which blade is part of the wire-cutter.

When a band is being severed and twisted the latch or divider R is held, by the pressure of the carriage P, down upon the shoulder $n$, and clamps the wire behind the eye $n^2$, and prevents its slipping back. The spring acts to depress the divider when the wire is sufficiently slack to permit it, and when the rounded side of the divider $r$ slips off the butts of the nippers as the carriage rises.

Forward of the cutter-blade S is an upright, $t$, Figs. 3 and 10, projecting from the stand transversely thereof, and having its open top formed into a segmental bearing of more than half a circle. The bearing may be made with an internal head or guide, upon which turns a deeply-recessed segment, T, with concave periphery, and capable of being completely rotated without obstruction. A spring-detent, $t'$, at one side of the bearing, engages a notch in one side of the whirl, holding it in position with the open side upward, so that when the gavel, with the wire in front of it, is pushed beyond the binder, the wire will fall into the recess of the segmental whirl. Beyond the whirl, at the inner end of stand N, is an upright forked blade or standard, U.

The upper part or entrance of the fork is about even with the line of the recesses in the whirl T and blade S; but the V of the fork is inclined with its point to one side, (see Fig. 4,) so that the lower portion of the wire, when the bundle is pushed beyond the binder, will fall into it, and be forced to one side out of line, and out of vertical line with the open portion of the band, for a reason hereinafter explained.

The active portion of the binder will now be described: Sliding perpendicularly in guides on the frame $A^1$ is an elliptical yoke, O, operated through shaft M, (see Figs. 2 and 7,) provided with a crank-arm, V, on which is a projection armed with a friction-roll, as shown in Fig. 1, and rotating within the yoke O. The shafts K and M are geared together equally, as already stated, by bevel-wheels 2 2, so that the rotation of the several cranks $v$, $v^1$, and V correspond, and when the rake has left the platform, and the compressors have grasped the gavel and lifted it fairly beyond the binder, the crank V has forced the yoke O down to its lowest point. At the bottom of this yoke is firmly secured the box or carriage P, which contains and conveys the active portions of the binder. Secured to the inner side of this carriage is a downwardly-projecting knife, S', with a deeply recessed bottom edge like the upward-pointing knife S on the stand. When the carriage descends this knife strikes past knife S, severing the wire, and leaving the end of the spool-wire lying and in front of the fixed blade S, when the spring-latch prevents its slipping back. Secured to carriage P, directly above thin blade of the latch or divider R, is a downwardly-projecting pair of nippers or pinchers, R', made with strong spring shanks and jaws springing together, whose adjacent faces taper back at the points, to admit the entrance of the blade of the latch R, and with square butts, leaving clear space above for the escape of the latch on the ascent of the nippers. When the carriage P descends and the shears S S' sever the wire, these jaws are forced apart by the blade of the latch or divider, being so held as the carriage continues descending, till their butts pass below the blade, springing together, and forcibly clamping the end of the wire, which they bring up with them on the ascent of the carriage, the rounded end of the latch slipping out from above the jaws, and the spring restoring it to position, or nearly so. Jour-naled within carriage P, exactly in vertical line with the recessed revoluble whirl T, is a little rotating shaft, W, having its inner end projecting from the carriage to a point just beyond the vertical line of the whirl, and between it and that of the forked standard U, this end of said shaft W being armed with a slightly-curved lateral spur, $x$.

The portion of the shaft beyond the carriage is made angular or blade-like, and fits into the recess in the revoluble whirl, (see Fig. 5,) and is so arranged as to commence revolving the moment it has fairly engaged it, turning it around several times along with the two parts of the wire-loop formed by the gavel, which it holds tightly by pressing it against the bottom of the recess in the segment, over which the lower side of the twisting-blade is formed to fit, and thus twisting the wire as many times as the twister-blade is geared to rotate. At the moment of the descent of the twisting-blade into the recess in the whirl the edge of the cutter S' of the carriage P strikes the spring-detent $t'$, (see Fig. 4,) releasing the whirl, and leaving it free to rotate with the twisting-blade. The upper part of the wire, as before stated, is out of vertical line with the lower, which rests in the one-sided fork U. An inverted V-formed guide, $y$, of wire, Fig. 4, or other suitable construction, projecting from the inner face of the carriage P over the twister-blade, and having its apex in line with the blade and whirl, guides the upper wire, as the blades descend, within reach of the spur $x$, which passes beneath it, and keeps the two parts of the wire separate, so that each is twisted alike, and the bundle securely fastened, and the wire prevented from slipping out, as would be the case if one of the wire ends were left straight and the other wound about it.

A perpendicular rack-bar, $Q^1$, sliding in the carriage P, and a projecting bracket on the yoke O operates the twister-blade at the proper speed, and stops it in the proper position, through the pinions $w$ $w^1$, Fig. 8, on a little shaft in the carriage, the larger pinion $w^1$ meshing with a small one, $w^2$, on the twister-shaft. The rack-bar itself is caused to ascend by a cam, Z, formed upon the crank-arm V, the point of which, when the crank has depressed the carriage to its lowest point, runs under a projection, $z$, on the back side of the rack-bar $Q^1$, armed with a friction-roll, raising the rack-bar and operating the twister $x$, and leaving it stationary when it has passed beyond it. The detent $t'$ again engages the whirl T, the carriage ascends, carrying with it the cut end of the wire, and the twisting-blade withdraws from the segment. As the carriage P rises the upper end of the rack-bar comes in contact with a stop, $q'$, on the top of the frame $A^1$, and the rack is pushed down, while the carriage ascends, until the twisting-blade has revolved back into position for the next gavel.

Projecting from the inner face of the carriage P, and immediately over the apex of the inverted V-formed guide y thereon, is a downwardly-curving finger, 6, pivoted to have limited vertical play. This finger bears down upon the middle of the bundle and immediately upon the wire, and assists in the compression.

Only so much tension in this binder is exerted on the wire as is needful to draw a sufficient length of it from the spool, and, when severed, the cut end is prevented from being detracted by being clamped on the rod or shoulder n by the divider R. There is no tension exerted on the wire during the binding, the bundle being fully compressed, and the twisting being effected while the wire is comparatively loose. Nor is a tension device needed for the spool.

I claim—

1. The rake-arm D, sliding upon the guide-rod E, and provided with a segmentally-slotted arm, d, in combination with an endless chain, adapted to receive said arm and permit the rake to rise and fall while drawing it in either direction, substantially as set forth.

2. An endless chain for operating the reciprocating rake, constructed of a chain-section, G, and a belt-section, g, provided with a tightening device, f, in combination with the sprocket-wheel H, given an intermittent rotation alternately in opposite directions, substantially as herein set forth.

3. The combination of the rake D, reciprocating upon guide-rod E, on which it is free to rise and fall, and provided with an arm, $D^2$, projecting rearwardly of the bearing on the guide-rod, with a fixed endless guide, F, in the rear, and an automatic switch-lever, I, for elevating the rake at the inner end of its sweep, and throwing said arm beneath the guide to hold the rake up, substantially as set forth.

4. The combination of the rotating crank-shaft K, reciprocating rack-bar J, pinion h, sprocket-wheel H, endless belt G, rake-arm D, and guide-rod E, substantially as and for the purpose set forth.

5. The combination of the crank-shaft K, reciprocating rack-bar J, pinion h, sprocket-wheel H, belt, and rake D with the slotted switch-lever I, operated from the crank-shaft, and the fixed endless guide F, substantially as and for the purpose set forth.

6. The combination of the crank-shaft K, the vertically-moving bar Q, and the rock-shafts L $L^1$ $L^2$, provided with compressing-fingers, all arranged and operating substantially as set forth.

7. The combination, with the stand N, perforated to admit through it the wire for binding, and having a transverse rod or shoulder, n, secured or formed on its top face, of the pivoted latch or divider R, having the eye $n^2$ formed on its under side, and recessed to fit the shoulder and clamp the wire, and provided with a spring for automatically depressing it, substantially as set forth.

8. The divider or latch R, pivoted to move to and from the face of the stand N, and formed with a depression, fitting a shoulder on the stand for clamping the wire, an eye on the under side as a passage and guide for the wire, and having the portion forward of the eye formed into a thin blade or wedge, substantially as and for the purpose set forth.

9. The combination of the bladed twister-shaft W x, and the whirl T, adapted to receive the twister-blade for operation, as described, with the fixed and movable cutters S S', substantially as and for the purpose herein set forth.

10. The combination, with the recessed whirl T, and the twister-blade x, with which it interlocks, and by which it is revolved, of a spring-detent, t', for holding said whirl in position to allow both the wire ends and the twister-blade to enter its recess for operation, as described.

11. The combination of the notched whirl T, spring-detent t, and projection on the moving carriage carrying the twister-blade, said projection being formed at the proper point on the carriage to release the whirl at the moment the twisting-blade engages it, substantially as set forth.

12. The vertically-moving carriage P, carrying the twisting-blade W, the cutter-blade S', and the spring-shank nippers R', in combination with the stand N, provided with the spring-latch R, for guiding the wire, the upright cutter S, and the revoluble recessed segment-whirl T, all arranged and operating substantially as and for the purpose set forth.

13. The twister-shaft, flattened to enter and hold the wire in the whirl-recess, and provided with the flat-pointed spur x, to enter between the ends of the wire so held outside of the whirl, and to be withdrawn therefrom, substantially as and for the purpose herein set forth.

14. The combination of the twister-blade W, intermittently revolving in the vertically-moving carriage P, and the recessed whirl T, capable of rotation in its bearings t', substantially as and for the purpose set forth.

15. The combination of the twister-blade W, having the lateral dividing-spur x on its end, the recessed segmental whirl T, with the forked standard U, having the bottom of the fork out of line with the recess in the whirl, substantially as and for the purpose set forth.

16. The inverted divided guide y y of the carriage P, in combination with the forked standard U, whirl T, and twister-blade W, substantially as and for the purpose herein set forth.

17. The combination, with the nippers R', having the flat shoulders, of the pivoted lifting-latch R, provided with the separator or divider r, adapted to pass upward between and clear of said nippers, and supported upon said shoulders in position to slide off by the ascent of the carriage P, carrying the nippers, as herein set forth.

18. The pivoted yielding latch R, provided with the eye $n^2$ and the end divider r, in combination with the seat-shoulder $n$, the nippers R′, cutters S S′, and the vertically-moving carriage P, substantially as and for the purpose herein set forth.

19. The shaft M, provided with the segmental cam Z, in combination with the vertically-moving rack-bar $Q^1$, provided with the roll $z$, and the horizontal twisted blade W $x$, connected with said rack-bar by intermediate gearing $w\ w^1\ w^2$, said cam passing beneath the rolls to elevate the rack-bar, and thereby operate the twister-shaft, as herein set forth.

20. The shaft M, provided with the double cam V Z, in combination with the elliptical yoke O, within which the crank-cam V operates, the rack-bar with the roll $z$, on which the cam Z acts, and the carriage P, carried by said yoke, and containing the twister and its operating pinions, all arranged to depress the twister-carriage while elevating the twister-operating rack-bar, as herein set forth.

21. The combination, with the cam-yoke O, the rack-bar $Q^1$, and the cams V Z, operating to depress the twister-carriage and to elevate the rack-bar, of the stop $q'$, for depressing the rack-bar by the ascent of the twister-carriage, substantially as herein set forth.

22. The combination, with the rock-shaft L and its fingers $m$, of the yokes $k$, and the pending auxiliary fingers $m^1$, to support the rising fingers and limit the inward movement of the pendent fingers in compressing the gavel.

23. The combination, with the crank-shaft K, and the rake operated thereby, as described, of the gavel-compressing devices connected with and operated by said crank-shaft through the link-and-arm connections $l\ q\ i$ of the rock-shaft L, and connections $l^1\ i^1\ l^2\ i^2$ of the rock-shafts $L^1\ L^2$, substantially as herein set forth.

In testimony whereof I have affixed my signature in the presence of two witnesses.

WILLIAM LOTTRIDGE.

Witnesses:
FRANK B. HYLAND,
OTIS O. BLANCHARD.